(12) United States Patent  (10) Patent No.: US 6,688,404 B2
Uhl et al. (45) Date of Patent: Feb. 10, 2004

(54) PORTABLE HANDHELD EDGE CUTTER

(75) Inventors: Klaus-Martin Uhl, Baltmannsweiler (DE); Heiko Rosskamp, Adelberg (DE); Claus Strodthoff, Waiblingen (DE)

(73) Assignee: Andreas Stihl AG & Co., Waiblingen (DE)

( * ) Notice: Subject to any disclaimer, the term of this patent is extended or adjusted under 35 U.S.C. 154(b) by 2 days.

(21) Appl. No.: 10/158,919

(22) Filed: Jun. 3, 2002

(65) Prior Publication Data

US 2002/0166677 A1 Nov. 14, 2002

Related U.S. Application Data

(63) Continuation-in-part of application No. 09/533,857, filed on Mar. 24, 2000, now abandoned.

(30) Foreign Application Priority Data

Mar. 27, 1999 (DE) ..................... 299 05 704 U

(51) Int. Cl.$^7$ ............................................. A01D 34/01
(52) U.S. Cl. .......................................... 172/15; 172/17
(58) Field of Search .............................. 172/13, 14, 15, 172/17, 42; 30/276, 296

(56) References Cited

U.S. PATENT DOCUMENTS

| 2,708,335 A | 5/1955 | Newton ................ 15/25.4 |
| 3,946,815 A | 3/1976 | Ajdukovic ............... 172/17 |
| 4,364,435 A | 12/1982 | Tuggle et al. ............ 172/15 |
| 5,263,303 A | 11/1993 | Stroud ................... 56/12.7 |
| 5,325,928 A | 7/1994 | Wagster et al. .......... 172/15 |
| 5,383,330 A | 1/1995 | Yokocho et al. ......... 56/256 |
| 5,402,627 A | 4/1995 | Trompler et al. ......... 56/12.7 |
| 5,407,012 A | 4/1995 | Klopfer .................. 172/15 |
| 5,826,667 A | 10/1998 | Notaras et al. .......... 172/15 |
| 6,092,608 A | 7/2000 | Leger .................... 172/15 |
| 6,116,350 A | 9/2000 | Notaras et al. .......... 172/15 |

*Primary Examiner*—Robert E. Pezzuto
*Assistant Examiner*—Kristine Florio
(74) *Attorney, Agent, or Firm*—Walter Ottesen

(57) ABSTRACT

A portable handheld lawn edger includes a cutterhead (2) at the end (16) of a guide tube (4) as well as an internal combustion engine (3) at the other end (17). The engine is connected to the cutter blade (5) via a drive shaft (20) in the guide tube (4) and in the cutterhead (2). The cutter blade is mounted for rotation about an axis (6), which lies parallel to the ground during cutting operation, and is guided along the edge. A guide wheel (27) is provided on the end of the cutterhead (2) facing toward the engine (3). The cutterhead (2) can be rolled over the ground with the aid of the guide wheel (27). The service life of the edge cutter (1) is increased and the manufacturing costs are reduced in that the cutterhead (2) is provided with a spacer (7, 9) approximately at the elevation of the drive axis (6) of the cutter blade (5). The spacer (7, 9) projects from the cutterhead and is set on the ground and prevents abrasion of the cutterhead (2).

19 Claims, 5 Drawing Sheets

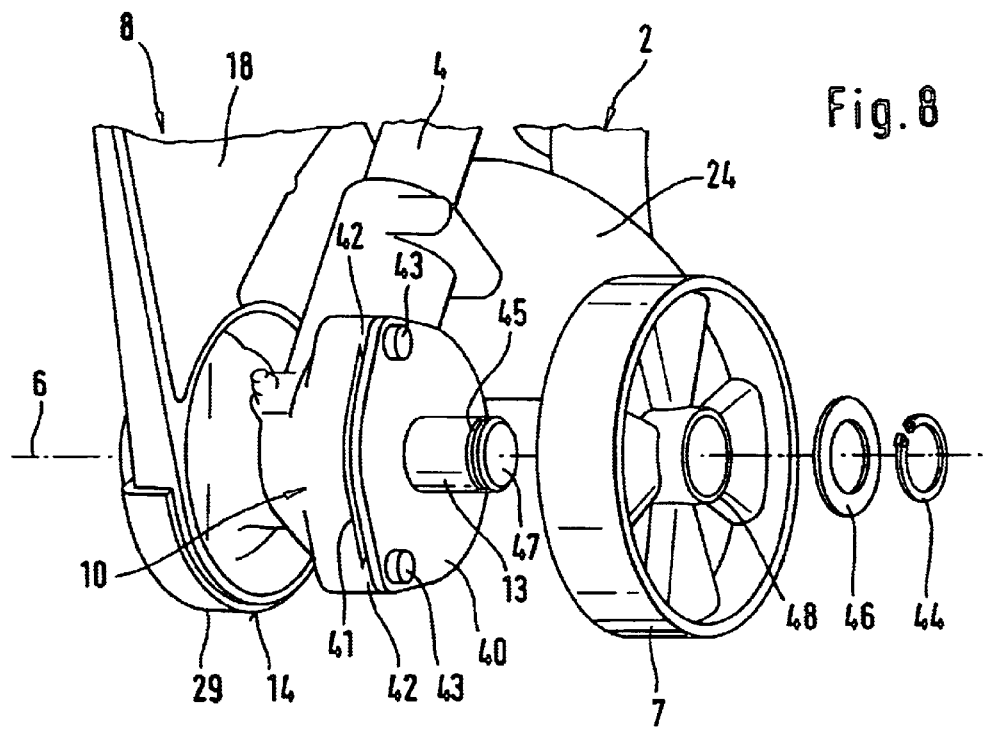
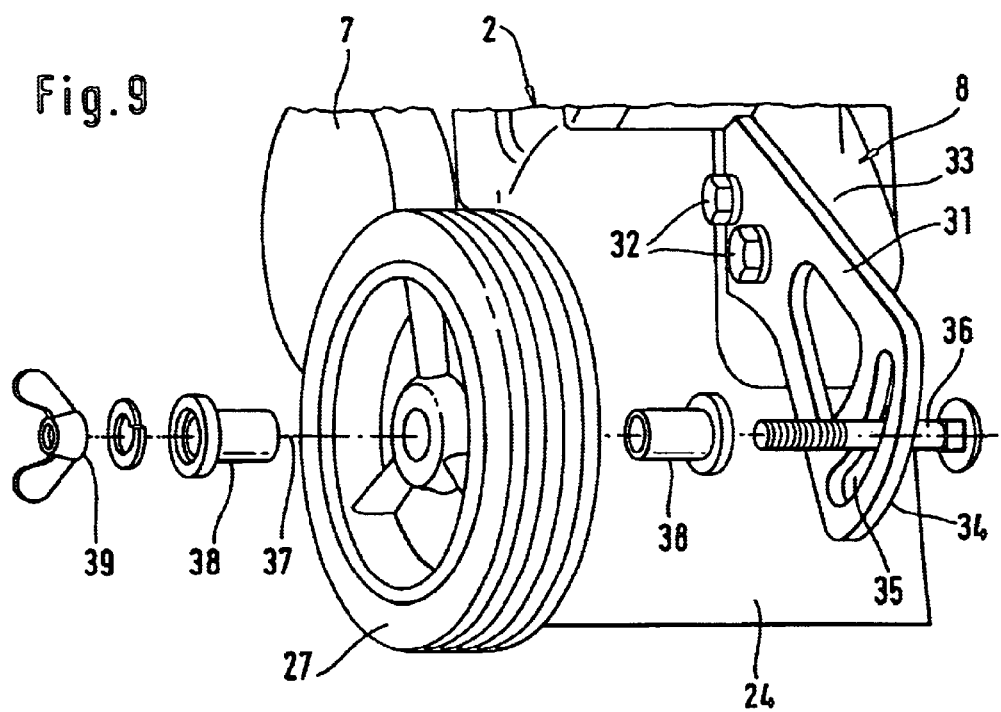

PORTABLE HANDHELD EDGE CUTTER

RELATED APPLICATION

This application is a continuation-in-part application of patent application Ser. No. 09/533,857, filed Mar. 24, 2000 now abandoned.

FIELD OF THE INVENTION

The invention relates to a portable handheld edge cutter especially for lawn cutting.

BACKGROUND OF THE INVENTION

In a work apparatus of this kind, a cutterhead is mounted at one end of a guide tube and an internal combustion engine is mounted at the other end of the guide tube. The engine is connected to a cutter blade via drive means in the guide tube and in the cutterhead. The cutter blade is mounted for rotation about an axis lying parallel to the ground during the cutting operation and is guided along the edge with the cutterhead. Such edge cutters with perpendicularly cutting blades are also known as edgers.

U.S. Pat. No. 4,364,435 discloses a lawn edger wherein a guide wheel is provided on the end of the cutterhead facing toward the internal combustion engine. The cutterhead is movable over the ground with the aid of the guide wheel. The guide wheel or roller is mounted at the rearward end of the cutterhead and aids the operator in maintaining a uniform cutting depth. On the one hand, the operator carries the edge cutter including the engine and, on the other hand, guides the cutterhead.

A light construction is desirable especially for edge cutters of the above kind which are carried by the operator.

SUMMARY OF THE INVENTION

It is an object of the invention to provide an edge cutter of the kind described above which is improved so that the service life of the edge cutter is increased while at the same time providing lower manufacturing costs.

The portable handheld edge cutter for edging a lawn or cutting turf includes: a drive motor; a cutterhead; a guide tube having a first end connected to the drive motor and a second end connected to the cutterhead; the cutterhead including a gear case having a drive shaft disposed transversely to the guide tube and approximately parallel to the ground; drive means disposed in the guide tube for connecting the drive motor to the drive shaft in the gear case; the drive shaft protruding at one end thereof from the gear case; a cutter blade mounted on the drive shaft at the one end thereof so as to be driven by the drive shaft for lawn edging or turf cutting; a guide wheel mounted between the drive motor and the gear case to facilitate rolling the cutterhead over the ground; the guide wheel defining a first rotational axis lying approximately parallel to the drive shaft; spacer means mounted on the cutterhead so as to be in contact engagement with the ground; the gear case having a side facing away from the cutter blade; the gear case having a support lug on the side thereof lying approximately coaxially with the drive shaft; a spacer wheel rotatably mounted on the support lug so as to define a second rotational axis; and, the first and second rotational axes being spaced from each other at a distance (z) viewed in the work direction of the edge cutter.

According to a feature of the invention, the cutterhead is provided with spacer means approximately at the elevation of the drive axis of the cutter blade. The spacer means project forward from the cutterhead. During operation of the edge cutter, the spacer means is placed on the ground and the cutterhead itself has no contact with the ground. In this way, a reliable guidance of the cutterhead and cutter blade along the edge to be trimmed is ensured. At the same time, the housing of the cutterhead is protected against wear.

The spacer means is configured as a wheel whereby no greater force is needed when guiding the tool along the edge. The additional spacer wheel lies at a distance to the guide wheel and stabilizes guiding the cutterhead along the edge. The spacer wheel is mounted on the side of the cutterhead facing away from the cutter blade and therefore rolls outside of or away from the ground region to be cut.

An advantageous position for the spacer wheel is when the spacer wheel is mounted for rotation at the elevation of the drive shaft of the cutter blade. In this way, a compact configuration of the cutterhead is achieved. The diameter of the spacer wheel is greater than the radial spacing of the bottom region of the cutterhead from the drive shaft. The spacer wheel can be held advantageously on a support lug formed on the gear housing.

In an alternate embodiment, the spacer for the cutterhead is configured as a skid which is placed with its running surface on the ground during operation of the edge cutter. The skid then protects the housing of the cutterhead against contact with the ground and from deterioration caused by wear.

A gear unit is mounted between the blade shaft and the drive shaft of the engine in the region of the cutterhead, which is spaced from the ground, and is therefore protected. The cutterhead housing advantageously comprises several joinable housing parts. The housing part, which is the lower housing part during operation, is configured as one piece with the skid. The housing part, which is configured with the skid, can be advantageously attached to the housing as a separate component. The part of the skid element defining the interior of the housing is formed to accommodate bearings for the blade shaft or the parts of the gear assembly.

BRIEF DESCRIPTION OF THE DRAWINGS

The invention will now be described with reference to the drawings wherein:

FIG. 8 is an enlarged exploded view of the bearing of the spacer wheel; and, FIG. 9 is an enlarged exploded view of the bearing of the guide wheel.

DESCRIPTION OF THE PREFERRED EMBODIMENTS OF THE INVENTION

Figure 1:
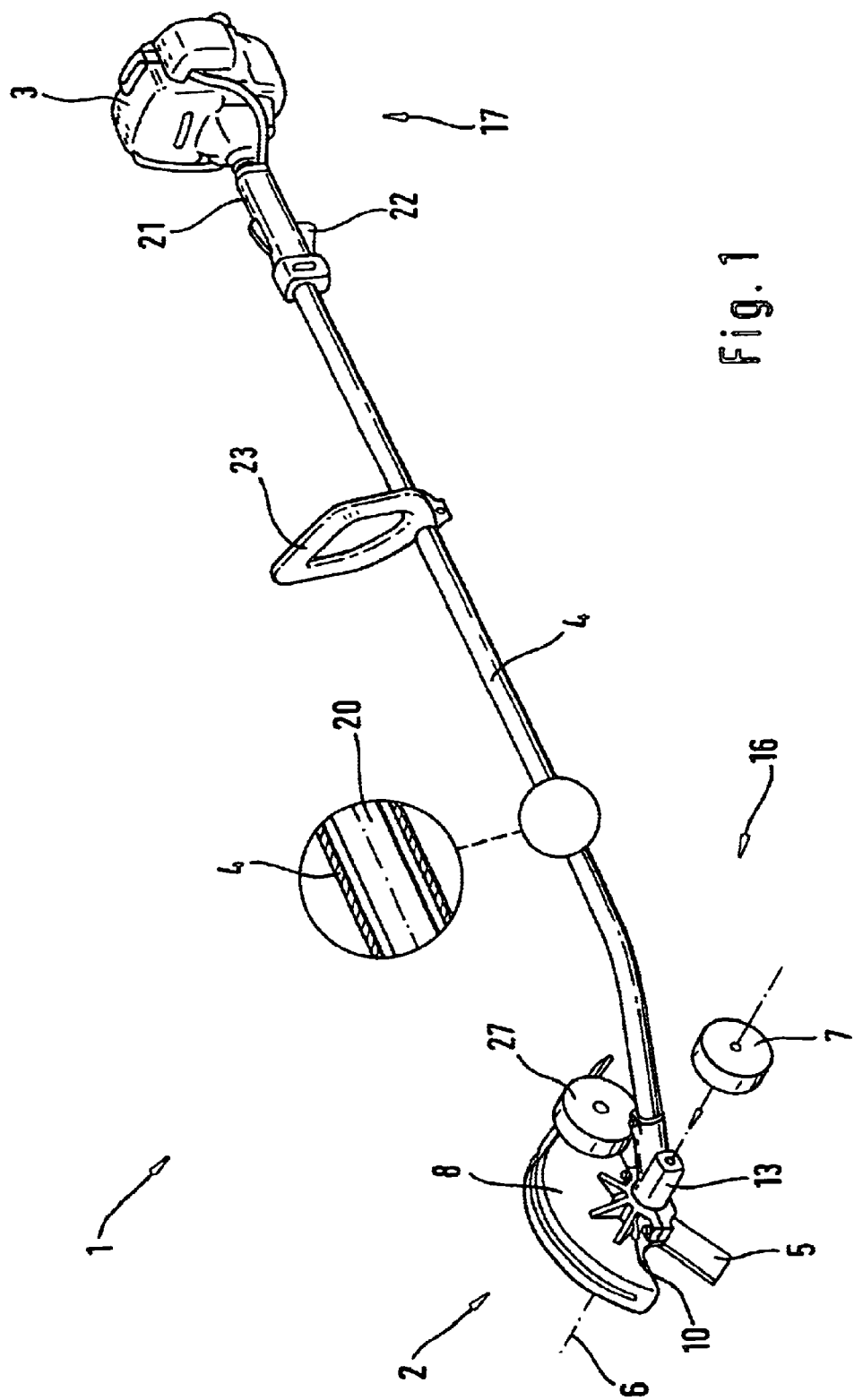
FIG. 1 is a perspective view of an edge cutter according to an embodiment of the invention.

FIG. 1 shows a portable handheld edge cutter 1 which essentially comprises a cutterhead 2 at the forward end 16 of a guide tube 4 and an internal combustion engine 3 at the rearward end 17 of the guide tube 4. The engine 3 drives a cutter blade 5 to rotate in the cutterhead 2 via a drive shaft 20 in the interior of the guide tube 4 and an angular gear. The cutter blade 5 is mounted to be rotatable about an axis 6 approximately parallel to the ground during a cutting operation. The cutter blade 5 cuts vertically when the cutterhead 2 is guided along the edge to be cut. A handle 21 is provided next to the engine 3 in the rearward region of the guide tube 4. The handle 21 includes a throttle lever 22 and additional operating elements of the edge cutter, as required. A further handle 23 is provided on the guide tube 4 for the guiding hand of the operator for guiding the cutterhead.

Figure 6:
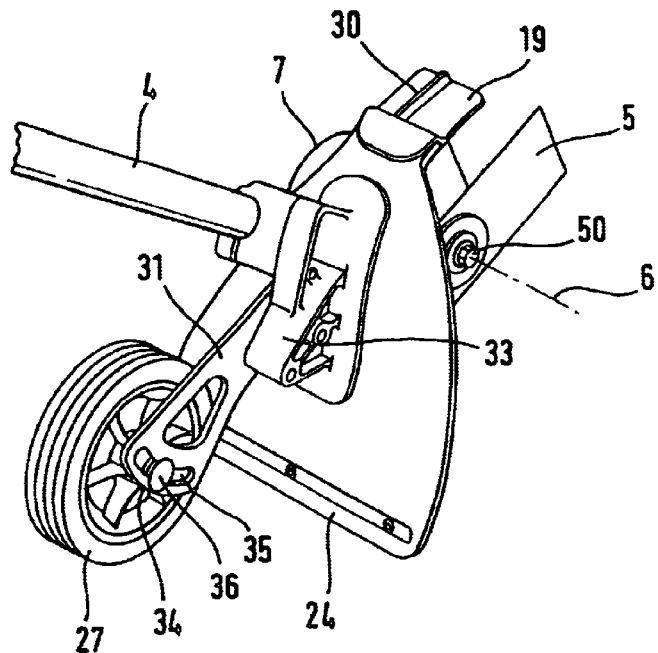
FIG. 6 is a view of the cutterhead as seen from the internal combustion engine.

A blade guard 8 is attached to the gear housing 10 of the cutterhead 2. The guard 8 radially covers the cutter blade 5 with a side wall 18 over a specific sector angle of the circle of rotation and engages over the movement region of the cutter blade 5 with an axial covering 19. A guide wheel 27 is provided between the engine 3 and cutterhead 2 and, in the present embodiment, is attached to the blade guard 8. For this purpose, and in accordance with FIGS. 6 and 9, a plate-shaped support arm 31 is mounted which is fixed at one end with attachment screws 32 to an assembly section 33 of the guard 8. The plate-shaped support arm 31 extends in a plane away from the guard 8 and this plane lies approximately parallel to the plane of rotation of the cutter blade 5. In the projecting end 34 of the support arm 31, a slot 35 is formed which lies in the plane of the support arm 31 and is penetrated by a support bolt 36 whose axis 37 lies approximately parallel to the rotational axis 6 of the cutter blade 5. Bearing bushings 38 are pushed onto the support bolt 36 and the guide wheel 27 is rotatably held on these bushings. The arrangement on the support arm 31 is fixed so that it cannot be displaced via a wing nut 39 threadably engaged on the support bolt 36. When the wing nut 39 is loosened, the support bolt 36 can be pushed along the arcuate guide slot 35 whereby the rotational axis 37 of the guide wheel 27 can be adjusted in elevation. In this way, the guide wheel 27 functions to adjust the depth of cut of the cutter blade 5 relative to the ground plane. The cutterhead 2 is rolled over the ground with the aid of the guide wheel 27. The guide wheel 27 can also be held on an adjustable plate or the like which, in turn, is pivotally journalled on the blade guard 8. Furthermore, the cutting depth can be adjusted by dropping or raising the guide tube 4 at the rearward end 17 in correspondence to the axial spacing between the guide wheel 27 and the rotational axis 6 of the cutter blade 5.

The cutterhead 2 is provided additionally with a spacer wheel 7 at the elevation of the rotational axis 6 of the cutter blade 5. The spacer wheel 7 projects with its diameter beyond the gear housing 10. The spacer wheel 7 is set on the ground during operation of the edge cutter 1 and protects the gear housing 10 against contact with the ground.

The rotational axis 6 of the spacer wheel 7 lies at a distance (z) to the rotational axis 37 of the guide wheel 27 viewed in the work direction 49 of the edge cutter. The sum of the radii (r) and R from the spacer wheel and the guide wheel is less than the distance (z).

Figure 2:
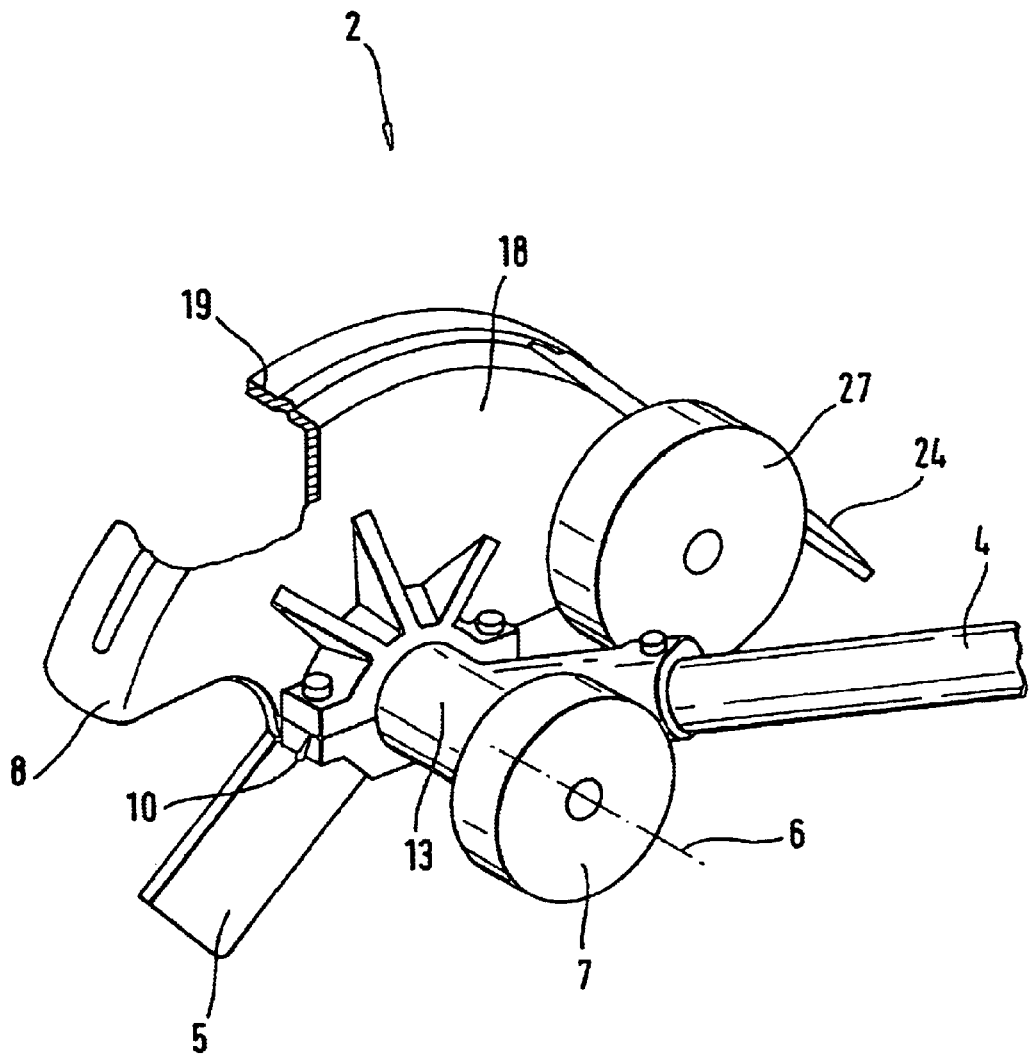
FIG. 2 is a detail view of the cutterhead with a wheel as a spacer.

FIGS. 2 and 8 show an enlarged view of the cutterhead 2 in the embodiment having a wheel 7 as spacer means for the cutterhead 2. The spacer wheel 7 is rotatably held on a support lug 13 at the end of the gear housing 10 facing away from the cutter blade 5. The support lug 13 is mounted approximately coaxially to the drive shaft 50 of the cutter blade 5. The support lug 13 is carried by a plate 40 which is fixed on the side of the gear housing 10 facing away from the cutter blade 5 (see FIG. 8). For this purpose, the gear housing 10 has screw pads 42 formed as one piece on the end face 41 facing toward the carrier plate 40. Attachment screws 43 pass through the carrier plate 40 and threadably engage the screw pads 42. The spacer wheel 7 is pushed axially on the support lug 13 and is fixed by a retaining ring 44 which engages in a peripheral slot 45 in the end 47 of the support lug 13. A freely rotatable washer 46 is disposed between the retaining ring 44 and the hub 48 of the spacer wheel 7. The gear housing 10 forms part of the cutterhead 2 and accommodates the drive shaft 50 of the cutter blade 5 and its bearing elements. Gear housing 10 especially holds gear elements for transmitting the drive power of the drive shaft 20 of the guide tube 4. The drive shaft 20 lies at an inclined angle to the rotational axis 6.

The end wall 18 of the cutter blade guard 8 has a two-part configured attachment flange which comprises two annular halves which are joined in a common flange plane. The cutter blade guard 8 is fixed to the gear housing 10 by the attachment flange. To increase stiffness, radial ribs are provided between the inner-lying end wall 18 of the cutter blade guard 8 and the annular half configured as one part therewith. The blade guard 8 exclusively comprises the inner-lying end wall 18 and the axial covering 19 for the rotating region of the blade 5. The blade guard 8 is open on the free end facing away from the cutterhead 2. This makes the interior space of the blade guard 8 easily accessible and permits the retained cuttings to be easily removed. The axial covering 19 has a bead, rib 30 or the like for indicating the rotational plane of the cutter blade 5 which is covered and therefore not visible for the operator. This makes it possible to accurately guide the edge cutter along the edge to be cut.

A splatter guard 24 is provided on the blade guard 8 next to the guide wheel 27. The splatter guard 24 (FIGS. 6 and 7) can be formed by an approximately tangentially extending extension of the axial covering 19. The splatter guard 24 holds back the cuttings discharged by the blade 5 in the direction of the operator when cutting the lawn edge.

Figure 3:
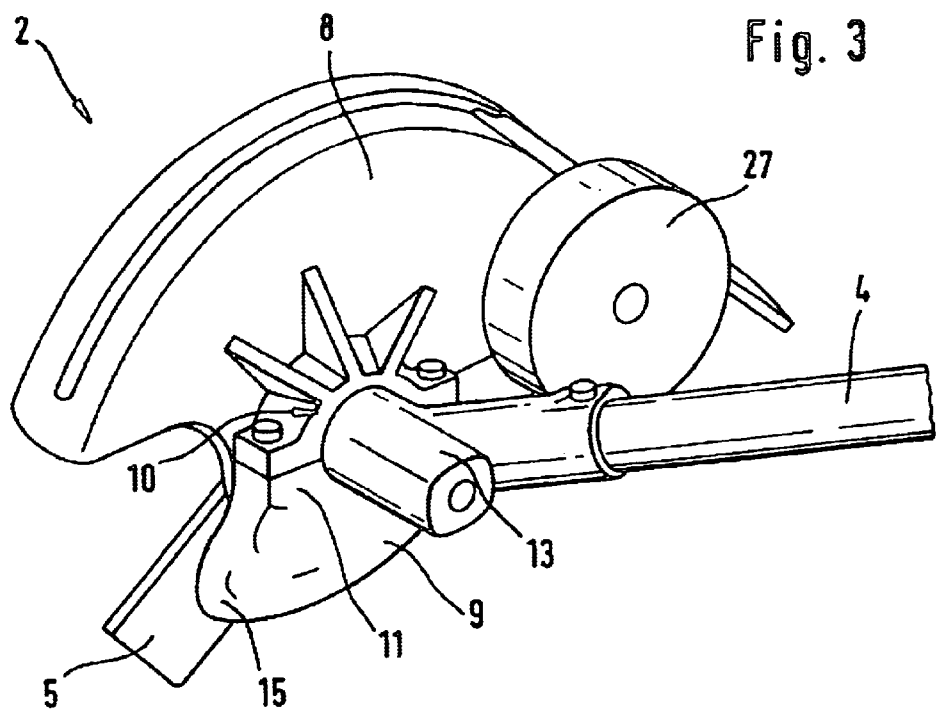
FIG. 3 is a perspective view of a cutterhead having a skid functioning as a spacer.

FIG. 3 shows a view of a cutterhead 2 having a spacer in the form of a skid 9. Here, the same reference numerals are used for the same parts. The skid 9 is set down on the ground during operation of the edge cutter and prevents a direct contact of the gear housing 10 with the ground. The guidance of the cutterhead 2 is facilitated for the operator by the guide wheel 27. The skid 9, which slides on the ground, prevents wear of the housing. The skid tip 15 is provided with a bellied configuration and lies forward in the working direction 49 of the edge cutter. The friction action is especially great in the region of the skid tip 15 so that a reinforcement with material counters this friction action.

The skid 9 forms the ring half 11 of the attachment flange which ring half lies below during operation of the edge cutter. The guard 8 is attached to the gear housing via the attachment flange. This ring half 11 with the skid 9 is manufactured as a separate component and is attached to the gear housing 10.

Figure 4:
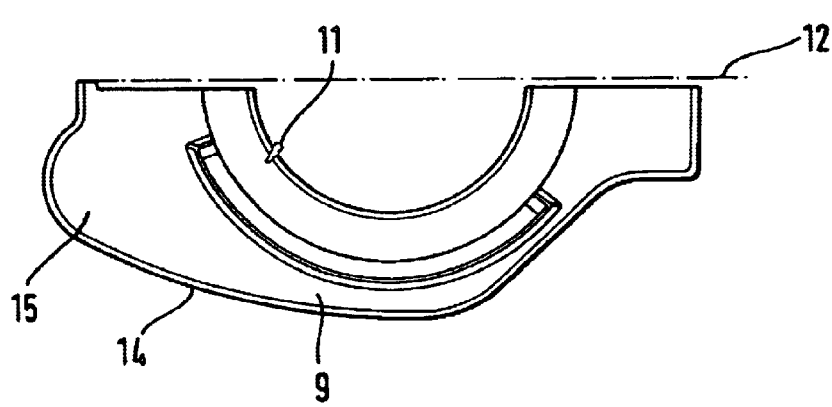
FIG. 4 is a side elevation view of a skid.

FIG. 4 shows a view of the lower ring half 11 which has the skid 9. The interior of the ring half 11 is correspondingly configured to accommodate the gear housing 10. The compact component is joined to the upper ring half of the attachment flange at the common flange plane 12. The running surface 14 of the skid 9 extends curved to the skid tip 15 and inwardly to the flange plane 12 whereby the sliding resistance of the cutterhead 2 is reduced when guiding along the edge to be cut.

Figure 5:
FIG. 5 is a plan view of the running surface of the skid of FIG. 4.

FIG. 5 shows a plan view of the running surface of the skid 9 which preferably comprises several ribs 25 running parallel to each other. The ribs 25 permit a wide radial projection of the slide surface relative to the base of the cutterhead 2 without unnecessarily increasing the total weight of the cutterhead. The skid component is attached to the cutterhead housing utilizing threaded bolts 26. The bolts 26 extend through the skid part and the bolt heads at the base of the ribs lie against the skid body. The ribs 25 are provided with recesses to accommodate the bolt heads and these recesses surround the bolt heads with a spacing s so that a rotation of the bolts is possible.

Figure 7:
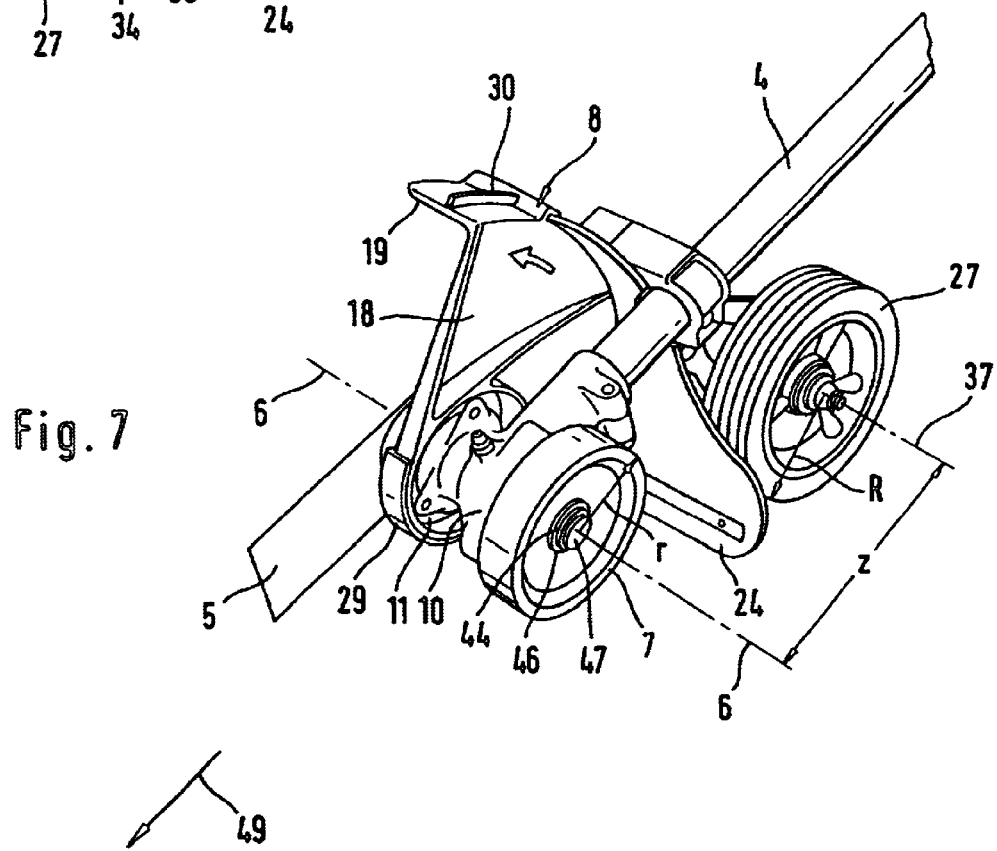
FIG. 7 is a perspective view of the cutterhead as seen from the front.

FIGS. 7 and 8 show a further embodiment of the edge cutter 1 according to the invention. In this embodiment, a spacer wheel 7 is provided as a spacing element on the one hand and, in the region of the cutter blade guard 8, a wear protector 29 is arranged on the other hand. The wear guard 29 is mounted as a strip on the region of the attachment flange of the guard 8 which faces toward the ground.

As noted above, a spacer wheel is provided on a supporting lug of the gear case which rolls on the ground. The spacer wheel 7 is at a distance (z) from the guide wheel 27 so that both wheels therefore lie at this distance (z) from each other in the work direction 49. For this reason, a more stable guidance for the edge cutter is provided in the work direction 49. If both wheels roll on the ground, then the guide tube 4 is lowered slightly to achieve a change of direction so that the forward spacer wheel 7 lifts from the ground. After the direction is corrected, the spacer wheel 7 is again brought down onto the ground so that a stable straight line run of the edge cutter is achieved because of the lateral slight offset of the wheels.

It is understood that the foregoing description is that of the preferred embodiments of the invention and that various changes and modifications may be made thereto without departing from the spirit and scope of the invention as defined in the appended claims.

What is claimed is:

1. A portable handheld edge cutter for edging a lawn or cutting turf comprising:
    a drive motor;
    a cutterhead;
    a guide tube having a first end connected to said drive motor and a second end connected to said cutterhead;
    said cutterhead including a gear case having a drive shaft disposed transversely to said guide tube and approximately parallel to the ground;
    drive means disposed in said guide tube for connecting said drive motor to said drive shaft in said gear case;
    said drive shaft protruding at one end thereof from said gear case;
    a cutter blade mounted on said drive shaft at said one end thereof so as to be driven by said drive shaft for lawn edging or turf cutting;
    a guide wheel mounted between said drive motor and said gear case to facilitate rolling said cutterhead over the ground;
    said guide wheel defining a first rotational axis lying approximately parallel to said drive shaft;
    spacer means mounted on said cutterhead so as to be in contact engagement with the ground;
    said gear case having a side facing away from said cutter blade;
    said gear case having a support lug on said side thereof lying approximately coaxially with said drive shaft;
    a spacer wheel rotatably mounted on said support lug so as to define a second rotational axis; and,
    said first and second rotational axes being spaced from each other at a distance (z) viewed in the work direction of said edge cutter.

2. The portable handheld edge cutter of claim 1, wherein said guide wheel has a first radius (R) and said spacer wheel has a second radius (r); and, said distance (z) is greater than the sum of said first and second radii (R, r).

3. The portable handheld edge cutter of claim 1, further comprising a support plate mounted on said gear case; and, said support lug being arranged on said support plate.

4. The portable handheld edge cutter of claim 3, wherein said gear case has attachment pads formed thereon; and, said edge cutter further comprises threaded bolts for engaging said attachment pads to fix said support plate on said gear case.

5. The portable handheld edge cutter of claim 1, wherein said gear case has an end facing toward said cutter blade; and, said edge cutter further comprises a wear strip mounted on said cutterhead with said wear strip facing to the ground.

6. The portable handheld edge cutter of claim 1, said spacer wheel being mounted to rotate about said drive axis.

7. The portable handheld edge cutter of claim 1, wherein said cutter blade defines a circle of rotation; and, said edge cutter further comprises a cutter blade guard on said cutterhead for radially and axially covering said cutter blade over a sector of said circle of rotation; said cutter blade guard having an outer side facing away from said cutterhead; and, said cutter blade guard being configured to be open on said outer side to facilitate removal of clippings from within said blade guard by an operator.

8. A portable handheld edge cutter for edging a lawn or cutting turf comprising:
    a drive motor;
    a cutterhead having a first side facing away from said drive motor and a second side facing toward said drive motor;
    a guide tube having a first end connected to said drive motor and a second end connected to said cutterhead;
    a cutter blade rotatably mounted on said cutterhead to rotate about a drive axis lying parallel to the ground when said edge cutter is in operation;
    drive means disposed in said guide tube and said cutterhead and connecting said drive motor to said cutter blade for driving said cutter blade in rotation;
    a guide wheel mounted on said cutterhead on said second side thereof for facilitating rolling said cutterhead over the ground;
    said cutterhead having spacer means at approximately the elevation of said drive axis and said spacer means projecting downwardly for being in contact engagement with the ground to facilitate guiding said cutterhead over the ground and said cutter blade along the edge to be cut; and,
    said spacer means being formed as a skid having a plurality of ribs extending parallel to each other.

9. The portable handheld edge cutter of claim 8, wherein said cutter blade defines a circle of rotation; and, said edge cutter further comprises a cutter blade guard on said cutterhead for radially and axially covering said cutter blade over a sector of said circle of rotation; said cutter blade guard having an outer side facing away from said cutterhead; and, said cutter blade guard being configured to be open on said outer side to facilitate removal of clippings from within said blade guard by an operator.

10. The portable handheld edge cutter of claim 8, wherein said cutter blade defines a plane; and, said ribs extending parallel to said plane.

11. A portable handheld edge cutter for edging a lawn or cutting turf comprising:
a drive motor;
a cutterhead having a first side facing away from said drive motor and a second side facing toward said drive motor;
a guide tube having a first end connected to said drive motor and a second end connected to said cutterhead;
a cutter blade rotatably mounted on said cutterhead to rotate about a drive axis lying parallel to the ground when said edge cutter is in operation;
drive means disposed in said guide tube and said cutterhead and connecting said drive motor to said cutter blade for driving said cutter blade in rotation;
a guide wheel mounted on said cutterhead on said second side thereof for facilitating rolling said cutterhead over the ground;
said cutterhead having spacer means at approximately the elevation of said drive axis and said spacer means projecting downwardly for being in contact engagement with the ground to facilitate guiding said cutterhead over the ground and said cutter blade along the edge to be cut;
said spacer means being a spacer wheel rotatably mounted on said second side of said cutterhead;
said drive means including a drive shaft rotatably mounted in said cutterhead for driving said cutter blade;
said cutterhead including a housing having a stub formed thereon;
said stub having a first stub branch formed thereon for accommodating said drive shaft therein;
said stub having a second stub branch formed thereon offset from said first stub branch for accommodating said spacer wheel; and,
said spacer wheel being rotatably mounted on said second stub branch to rotate at least nearly about said drive axis separately from and independently of said drive shaft.

12. The portable handheld edge cutter of claim 11, said spacer wheel being mounted to rotate about said drive axis.

13. The portable handheld edge cutter of claim 11, wherein said cutter blade defines a circle of rotation; and, said edge cutter further comprises a cutter blade guard on said cutterhead for radially and axially covering said cutter blade over a sector of said circle of rotation; said cutter blade guard having an outer side facing away from said cutterhead; and, said cutter blade guard being configured to be open on said outer side to facilitate removal of clippings from within said blade guard by an operator.

14. A portable handheld edge cutter for edging a lawn or cutting turf comprising:
a drive motor;
a cutterhead having a first side facing away from said drive motor and a second side facing toward said drive motor;
a guide tube having a first end connected to said drive motor and a second end connected to said cutterhead;
a cutter blade rotatably mounted on said cutterhead to rotate about a drive axis lying parallel to the ground when said edge cutter is in operation;
drive means disposed in said guide tube and said cutterhead and connecting said drive motor to said cutter blade for driving said cutter blade in rotation;
a guide wheel mounted on said cutterhead on said second side thereof for facilitating rolling said cutterhead over the ground;
said cutterhead having spacer means at approximately the elevation of said drive axis and said spacer means projecting downwardly for being in contact engagement with the ground to facilitate guiding said cutterhead over the ground and said cutter blade along the edge to be cut;
said spacer means being formed as a skid having a plurality of ribs extending parallel to each other; and,
said cutterhead including a housing having at least two housing parts and one of said housing parts being a lower housing part when said edge cutter is in operation and said lower housing part being configured to define said skid as an integral part thereof.

15. The portable handheld edge cutter of claim 14, said lower housing part being connected to the other housing part as a separate component.

16. The portable handheld edge cutter of claim 14, the other one of said housing parts being an upper housing part; said upper housing part and said lower housing part conjointly defining a common flange plane whereat said lower housing part is joined to said upper housing part.

17. The portable handheld edge cutter of claim 16, wherein said lower housing part is formed to have a forward skid tip and said skid of said lower housing part having a running surface which extends to said skid tip and then bends inwardly toward said common flange plane.

18. A portable handheld edge cutter for edging a lawn or cutting turf comprising:
a drive motor;
a cutterhead;
a guide tube having a first end connected to said drive motor and a second end connected to said cutterhead;
said cutterhead including a gear case having a drive shaft disposed transversely to said guide tube and approximately parallel to the ground;
drive means disposed in said guide tube for connecting said drive motor to said drive shaft in said gear case;
said drive shaft protruding at one end thereof from said gear case;
a cutter blade mounted on said drive shaft at said one end thereof so as to be driven by said drive shaft for lawn edging or turf cutting;
a guide wheel mounted between said drive motor and said gear case to facilitate rolling said cutterhead over the ground;
said guide wheel defining a first rotational axis lying approximately parallel to said drive shaft;
spacer means mounted on said cutterhead so as to be in contact engagement with the ground;
said gear case having a side facing away from said cutter blade;
said gear case having a support lug on said side thereof lying approximately coaxially with said drive shaft;
a spacer wheel rotatably mounted on said support lug so as to define a second rotational axis;
said first and second rotational axes being spaced from each other at a distance (z) viewed in the work direction of said edge cutter; and,
said guide wheel and said spacer wheel being offset laterally from each other.

19. The portable handheld edge cutter of claim 18, wherein said guide wheel and said spacer wheel are the only wheels of said edge cutter in contact engagement with the ground during lawn edging or turf cutting.

* * * * *